Nov. 21, 1944.    L. P. DOSMANN    2,363,051
METHOD OF MAKING CELLULAR RUBBER
Filed Dec. 16, 1943
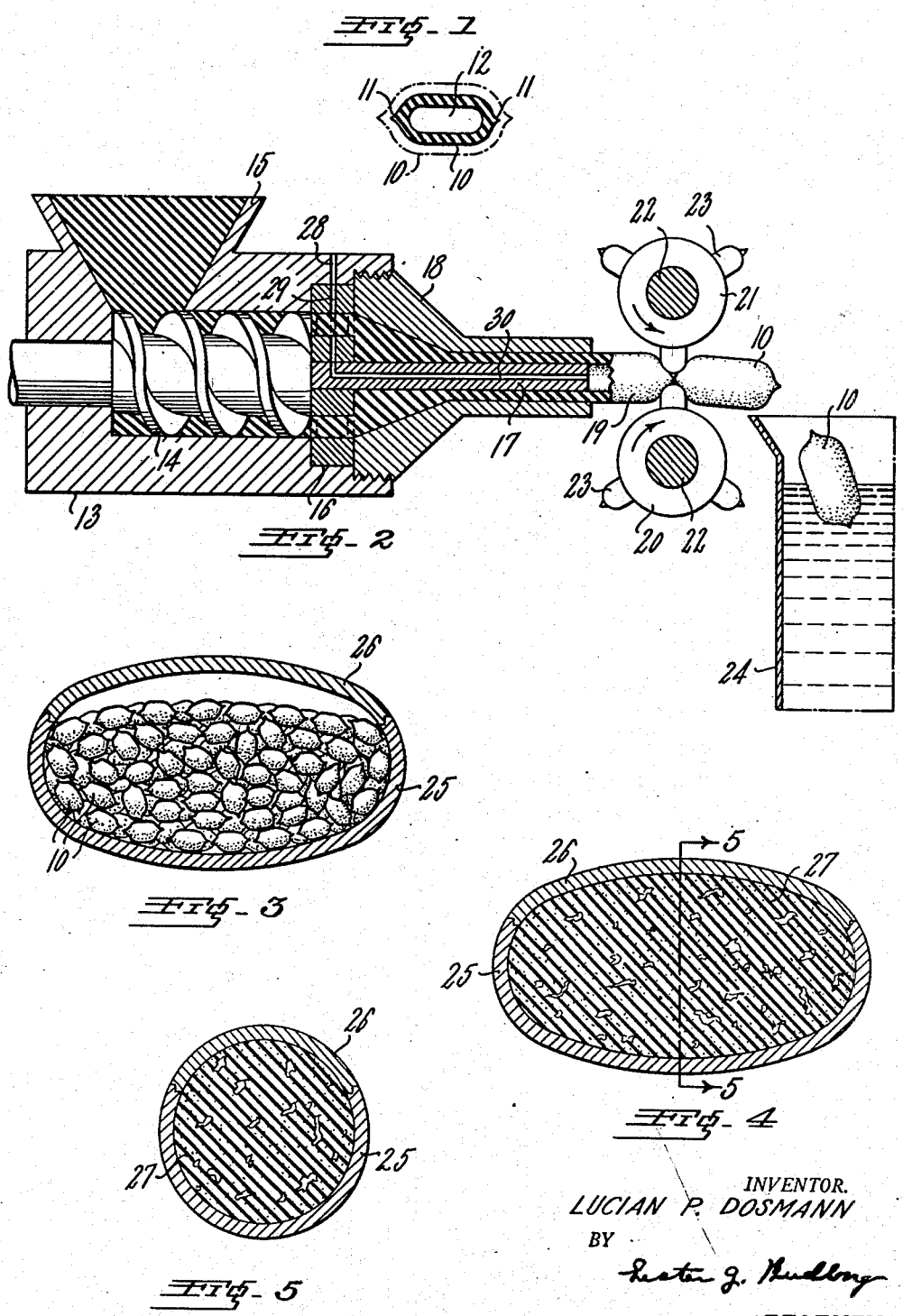
INVENTOR.
LUCIAN P. DOSMANN
BY
ATTORNEY Patented Nov. 21, 1944

2,363,051

UNITED STATES PATENT OFFICE 2,363,051

METHOD OF MAKING CELLULAR RUBBER

Lucian P. Dosmann, Mishawaka, Ind., assignor to United States Rubber Company, New York, N. Y., a corporation of New Jersey Application December 16, 1943, Serial No. 514,525

7 Claims. (Cl. 18—53)

This invention relates to a method of making cellular rubber from milled or masticated rubber.

Cellular rubber as made heretofore is usually classified as of the closed cell type or of the open cell type. The present method is adapted to produce a cellular rubber or sponge rubber having both closed cells and open cells to a substantial degree.

The product produced by the method of the present invention will be hereinafter called cellular rubber, which term is to be construed broadly as including expanded rubber, porous rubber and sponge rubber.

In the manufacture of cellular rubber by the methods employed heretofore it has been difficult to produce an integral cellular rubber mass more than a few inches thick, since the weight of the unvulcanized rubber stock and thickness of the mass thereof have a definite bearing upon the degree of expansion that can be secured in a final vulcanized cellular rubber.

In the manufacture of latex cellular rubber in which latex is whipped up with air or by mechanical means, a vulcanized cellular mass having any desired thickness up to about six inches can be produced, but heretofore when cellular rubber of light density was produced from milled or masticated rubber having a blowing agent distributed therethrough, it was difficult to produce a light density cellular mass more than about two inches thick when vulcanized.

The present method provides a simple, practical and inexpensive method for producing from milled or masticated rubber a vulcanized cellular rubber many inches thick, and which may be molded during the vulcanizing stage in any shape or depth of mold that could be used heretofore in molding latex foam.

In carrying out the present invention, a rubber compound of milled rubber in a plastic condition and having any suitable blowing agent uniformly distributed therethrough, is formed into small hollow balls or pellets. Each pellet in the unvulcanized condition has a sealed hollow chamber containing trapped air or other trapped gas, or if preferred each pellet may contain a volatile liquid.

These hollow pellets may be made up in any desired quantity and retained on hand ready to be introduced into a vulcanizing mold of any size and shape that is to be used in making cellular rubber objects. The mold can be readily filled with these hollow pellets irrespective of its shape since the pellets can be easily shifted relatively to each other or rolled one upon the other to fill up all portions of the mold. The mold may then be closed but preferably should be provided with vents for the escape of air or gases so as to avoid building up an appreciable pressure in the mold when heat is applied. The mold may be heated during the vulcanizing period by any preferred or well known means.

The use of the above described unvulcanized pellets to charge a mold, not only greatly facilitates the filling of molds of various shapes and contours but has other important advantages; one being that since each pellet has a quantity of air or other gas sealed therein in its hollow chamber, this air or gas will expand as the pellets are heated, and this will expand or inflate the pellets to help fill all parts of the mold; another being that this trapped air in the pellets throughout the rubber charge will increase the cellular structure of a thick charge. In addition to the expansion of the rubber charge in the mold caused by the expansion of the air in the pellets there will be the added expansion in the rubber of the pellets due to the activity of the blowing agent.

As the application of heat is continued the rubber forming the pellets will be softened until the trapped air or gas within the pellets escapes and travels through the rubber charge towards the walls of the vulcanizer or towards the escape openings to thereby form air passages leading to the exterior of the rubber mass. This will impart to the rubber mass, at least to some degree, an open cell construction. As the softened rubber continues to expand under the action of the blowing agent and heat, the individual pellets will merge coalesce together into an integral cellular mass filling the mold completely, to be vulcanized in this condition under the continued application of heat.

When a pellet due to the application of heat is expanded by the expansion of the trapped air or gas and the softening of the rubber forming the pellet permits the confined air or gas to escape, the pressure within the hollow chamber of the pellet will be relieved so that the inner walls of the pellet may then expand inwardly under the action of the blowing agent to reduce the size of this hollow chamber. This produces a vulcanized cellular rubber mass in which the hollow chambers of the pellets are very largely obliterated, and also makes possible the production of a much thicker mass of cellular rubber from milled rubber than could be produced heretofore.

The pellets of unvulcanized milled rubber containing a blowing agent and having a sealed hollow chamber containing trapped air or gas may be variously formed. One good practical form of apparatus for producing these pellets is disclosed in the accompanying drawing, as is also a form of mold for use in vulcanizing a charge of these pellets to produce a cellular rubber mass of the desired shape.

In the drawing:

Fig. 1 is a longitudinal sectional view of an unvulcanized hollow rubber pellet such as contemplated by the present invention.

Fig. 2 is a vertical sectional view of a rubber extruder, and of associated parts for forming pellets from a tube of unvulcanized rubber.

Fig. 3 is a longitudinal vertical sectional view through an elliptical shaped vulcanizing mold which has been approximately filled with these unvulcanized pellets.

Fig. 4 is a similar view showing the appearance of the cellular rubber mass at the completion of the vulcanizing operation; and Fig. 5 is a sectional view taken on the line 5—5 of Fig. 4.

The hollow pellets contemplated by the present invention and formed of unvulcanized milled rubber containing a blowing agent, and having a chamber in which air or gas is confined may be given any desired size and shape. It is believed desirable however in most cases to make these pellets relatively small having an overall length, for example, of less than inch. The pellet shown in Fig. 1 of the drawing and designated by the numeral 10 is approximately cylindrical in shape and has the closed ends 11 and sealed hollow chamber 12. The appearance of this pellet after it has been expanded by the expansion of air or gas therein, under the application of heat, is indicated in Fig. 1 by dot and dash lines.

One good practical form or apparatus for producing the pellets 10 is shown in Fig. 2 wherein there is provided a rubber extruding machine of well known construction having the main cylindrical casing 13 in which there is provided the feeding screw 14. The milled rubber compound containing the blowing agent is introduced in the casing 13 through the hopper 15. The casing 13 may be water cooled by means not shown to prevent heating by the extruding operation. A spider 16 is removably mounted in the casing 13 near its discharge end and serves to support the pin 17 at the central longitudinal axis of the extruding machine. Surrounding the pin 17 in spaced relation thereto is provided the extruding nozzle 18 which is threadedly secured to an end of the casing 13. The arrangement is such that rotation of the feeding screw 14 will force the masticated rubber through the nozzle 18 about the pin 17 to form the tube 19 of unvulcanized rubber containing a blowing agent.

Pellets of any desired length may be formed from the tube 19 by pinching the tube to close the ends of the pellet as indicated by 11. The means shown in Fig. 2 for pinching the tube 19 at short intervals comprises a pair of power driven wheels 20 and 21 which are rotated at the same speed by their shafts 22, and upon which wheels are provided the pinching projections 23 adapted to pinch the inner walls of the tube 19 together and also to sever the tube as will be apparent from Fig. 2. The pellets 10 thus formed may fall into the tank 24 containing a zinc stearate solution adapted to coat the exterior of the pellets to render them less tacky, and also to facilitate the merging of one pellet with another when they are heated above the softening point for the zinc stearate and rubber.

As soon as the pellets 10 are coated with the zinc stearate they may be removed from the tank 24 as they are now ready to be introduced into a vulcanizing mold of any desired size or shape. One such mold is shown in Figs. 3, 4 and 5 of the drawing which illustrate a mold 25 of elliptical shape to show how well the present pellets are adapted to fill a mold of varying cross-sectional area. The mold 25 is shown as having the removable cover 26. This mold may be heated during the vulcanizing period by any suitable means, not shown, and the mold preferably has one or more vents or is otherwise constructed so that gases released in the mold may escape therefrom. The mold of Fig. 3 is shown as approximately filled with the unvulcanized pellets 10 and is ready to have heat applied to start: (1) expanding of the air or gas that is sealed within the hollow pellets to inflate these pellets; (2) an expansion of the rubber forming the pellets due to the action of the blowing agent; (3) merging of the pellets together as the rubber thereof approaches a soft plastic condition; (4) the air or gas which escapes from the individual pellets to travel towards the walls of the vulcanizer and thereby impart to the rubber mass, at least to a substantial degree, an open cellular construction; and (5) vulcanization of the expanded rubber mass to impart to the same the shape of the inside of the mold.

Fig. 4 shows the appearance of the rubber charge within the mold 25 upon completion of the vulcanization of the rubber mass 27, and the transverse sectional view of Fig. 5 shows that the hollow chambers of the pellets 10 in which air or gas was previously confined have almost entirely disappeared as the pellet walls expand inwardly under the action of the blowing agent to fill up these chambers.

Should it be found, when the construction of Fig. 2 is employed to form the rubber tube 10, that sufficient air does not find its way inside of this tube to avoid partial collapsing of the tube, this may be corrected by providing a bleed passage 28 extending inwardly through a side wall of the casing 13 and through the passage 29 in the spider 16 to a small hole 30 extending lengthwise of the pin 17 to the right hand end thereof as shown.

Should it be desirable to supply a gas to the interior of the tube 19 instead of air, or to supply a volatile liquid which will form a gas upon the application of heat, this may be readily accomplished by introducing such gas or liquid through the bleed passage just mentioned.

The physical characteristics of the rubber compound and blowing agent from which the pellets 10 are made may vary extensively, three good practical examples are as follows:

*Parts by weight in grams*

|  | A | B | C |
|---|---|---|---|
| Pale crepe (high Scott plasticized) | 500 | 500 | 500 |
| Laurex (zinc soap of cocoanut oil acids) | 30 | 30 | 18 |
| Keystone white (loading material) | 60 | 250 | 400 |
| Zinc oxide | 18 | 18 | 20 |
| Soda and oil {50 parts by wt. of paraffin oil, 50 parts by wt. of soda bicarbonate} | 100 | 110 |  |
| Paraffin oil |  |  | 40 |
| Agerite white (antioxidant) (di-betanaphthylpara-phenylenediamine) | 5 | 5 | 5 |
| Altax (accelerator) | 3.75 | 3 | 4.5 |
| Zinite A (accelerator) | 3 | 2 |  |
| Retarder W. (salicylic acid) retards cure | 1.25 | 1.25 |  |
| DPG (accelerator) |  | .5 | 6 |
| Sulfur | 20 | 16.5 | 16.5 |
| Stearic acid | 40 |  |  |
| Unicel (diazoaminobenzene) (nitrogen-liberating blowing agent) |  |  | 25 |
| Acetic acid (retarder) | 10 | 10 | 15 |
| Carbon black |  |  | 10 |

Add coloring matter and deodorant as desired.

The air or gas trapped within each pellet 10 will expand under the action of the heat and eventually escape as above stated, this will cause an open cell structure to be formed by this escaping air or gas while a closed cell structure will be formed by the gases produced by the blowing agent. The trapped air or gas keeps the pellets inflated in the mold until the rubber is partially set by curing, then the gases in the pellets escape. In this way a molded rubber object is produced having both closed cells and open cells.

The present method produces a continuous cell structure which is desirable, for otherwise the cellular rubber will have a low rebound characteristic. It has been characteristic of cellular rubber heretofore when made of milled rubber to have a closed cell structure, in contrast with latex sponge which has an open cell structure. An examination of cellular rubber produced in accordance with the present method shows that the air or gas which escapes from the pellets forms a continuous cell structure somewhat similar to that found in latex sponge. During the cure the zinc stearate dissolves in the rubber and allows complete coalescence of all the pellets.

The density of the cellular rubber produced in accordance with the present invention may be varied as desired by varying the thickness of the walls of the rubber tube 19. For example, if a relatively high density cellular rubber is desired the tube 19 might have an outside diameter of ⅜ of an inch and an inside diameter of less than ¼ of an inch, whereas if a lower density cellular rubber is desired the outside diameter might remain at ⅜ of an inch while the inside diameter should be more than ¼ of an inch.

The present cellular rubber mass being free from moisture is ready for use as soon as it has cooled after vulcanization. The rubber mix given by the above examples will be somewhat soft and doughy, and may tend to cold flow in the pellets. This tendency to cold flow can be reduced by adding about 5 to 10 per cent by weight of a suitable hard resinous rubber isomer. The temperature used in vulcanizing the rubber mix of the above given examples should be about 300° F.

An examination of a number of samples of cellular rubber produced in accordance with the present invention showed the samples to have an average of about 25 per cent closed cells and 75 per cent open cells.

It will be seen from the foregoing that by employing the method of the present invention a cellular rubber may be made from milled rubber to produce a vulcanized rubber mass much thicker than it was practical to produce heretofore. Also that by employing the present method molds of various shapes can be completely filled with the blown vulcanized rubber, and that the rubber thus produced will have both closed cells and open cells to a substantial degree. This method, it is found, gives a high tensile product.

The term "rubber" unless otherwise modified, as used in the specification and claims is intended to be used in its generic sense to include rubber substitutes, natural rubber, compounded rubber, synthetic rubber, and the like.

Having thus described my invention, what I claim and desire to protect by Letters Patent is:

1. The method of making cellular rubber which comprises, introducing into a mold a charge of pellets formed of milled vulcanizable rubber containing a blowing agent and each pellet having a sealed hollow chamber containing trapped gas, supplying sufficient heat to cause, (1) the trapped gas to inflate the individual pellets, (2) the blowing agent to expand the rubber and (3) the rubber of the pellets to merge into a mass and vulcanize, to thereby form the charge of pellets into a molded vulcanized cellular mass.

2. The method of making cellular rubber which comprises, introducing into a mold a charge of pellets formed of milled vulcanizable rubber containing a blowing agent and each pellet having a sealed hollow chamber containing trapped gas, supplying sufficient heat to cause, (1) the trapped gas to inflate the individual pellets, (2) the blowing agent to expand the rubber and (3) the rubber of the pellets to merge into a mass and vulcanize, whereby to form from the charge of pellets a molded vulcanized cellular mass having both closed cells and open cells to a substantial degree at the completion of the vulcanizing stage.

3. The method of making cellular rubber which comprises, charging a mold with pellets formed of milled vulcanizable rubber containing a blowing agent and adapted to move bodily one relatively to the other in the mold as they expand, each pellet having a sealed hollow chamber containing trapped gas, supplying sufficient heat to cause (1) the trapped gas to inflate the individual pellets, (2) the blowing agent to expand the rubber and (3) the rubber to vulcanize, to thereby form a molded vulcanized cellular mass.

4. The method of making a cellular rubber object of varying cross sectional area which comprises, charging a mold of varying cross section with pellets formed of milled vulcanizable rubber containing a blowing agent and adapted to move bodily one relatively to the other in the mold as they expand, each pellet having a sealed hollow chamber containing trapped air, supplying sufficient heat to cause, (1) the trapped air to inflate the individual pellets, (2) the blowing agent to expand the rubber and (3) the rubber to vulcanize, to thereby form a vulcanized cellular mass having the shape of the mold.

5. The method of making a molded cellular rubber object which comprises, charging a mold with pellets formed of milled vulcanizable rubber containing a blowing agent and adapted to move bodily one relatively to the other in the mold as they expand, each pellet having a sealed hollow chamber containing trapped air, supplying sufficient heat to cause, (1) the trapped air to inflate the individual pellets and escape therefrom, (2) the blowing agent to expand the rubber and (3) the rubber to vulcanize, to thereby form a vulcanized cellular mass shaped to the mold and having open cells formed by the escaping air.

6. The method of making cellular rubber which comprises, introducing into a mold a charge of pellets formed of milled vulcanizable rubber containing a blowing agent and each pellet having a sealed hollow chamber containing trapped air, supplying sufficient heat to cause, (1) the trapped air to inflate the individual pellets and then escape, (2) the blowing agent to expand the rubber and (3) the rubber to vulcanize, to thereby form a molded vulcanized cellular mass having at least 50% open cells at the completion of the vulcanizing stage.

7. The method making an integral cellular rubber mass many inches thick which comprises, introducing into a mold a charge of pellets formed of milled vulcanizable rubber containing a blowing agent and each pellet having a sealed hollow chamber containing trapped gas to thereby provide a substantial quantity of gas throughout the charge, supplying sufficient heat to cause the trapped gas to inflate the pellets and then escape and the blowing agent to expand the rubber of the pellets and the rubber to vulcanize, so as to form a thick molded vulcanized cellular mass.

LUCIAN P. DOSMANN.